(No Model.)
G. H. WESTINGHOUSE.
VEHICLE AXLE.
No. 517,203.                               Patented Mar. 27, 1894.
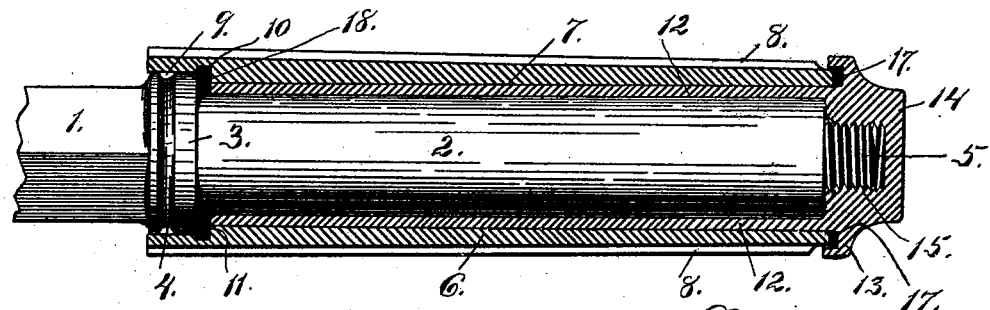
Fig. 1.
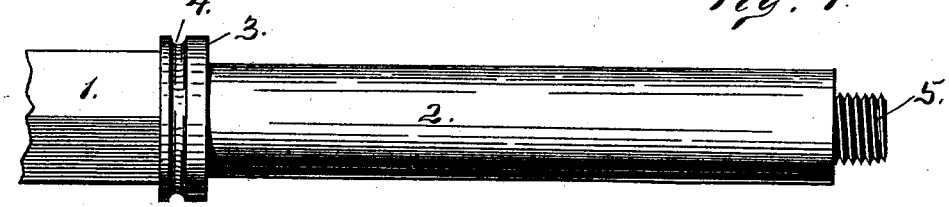
Fig. 2.
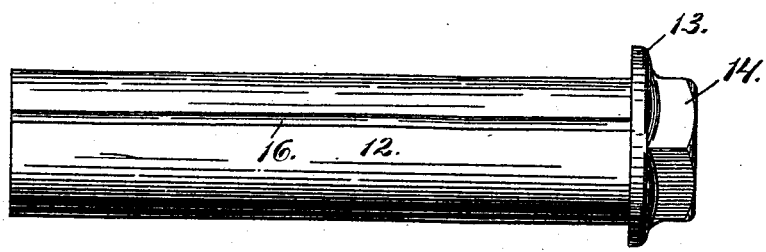
Fig. 3.
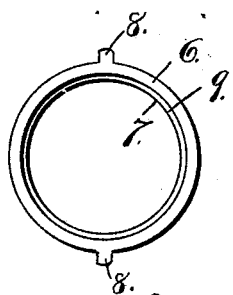 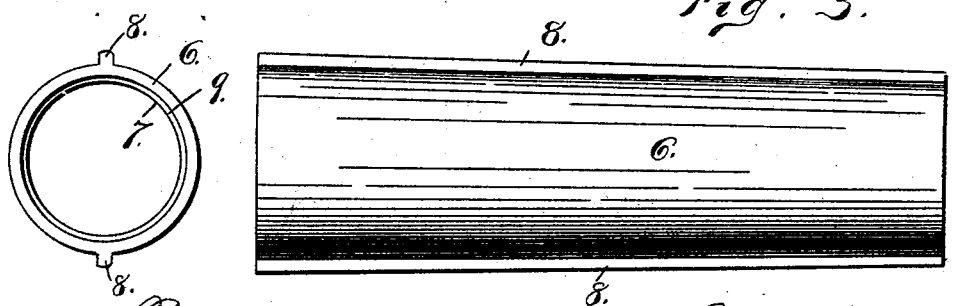
Fig. 5.                                    Fig. 4.
Witnesses:                                 Inventor:
Geo. D. Wightman                           George H. Westinghouse.
F. P. Kirstin                              By Miller & Hoddick
                                              Attorneys.
THE NATIONAL LITHOGRAPHING COMPANY,
WASHINGTON, D. C.

UNITED STATES PATENT OFFICE.

GEORGE H. WESTINGHOUSE, OF BUFFALO, NEW YORK.

VEHICLE-AXLE.

SPECIFICATION forming part of Letters Patent No. 517,203, dated March 27, 1894.

Application filed July 13, 1893. Serial No. 480,347. (No model.)

*To all whom it may concern:*

Be it known that I, GEORGE H. WESTINGHOUSE, a citizen of the United States, residing at Buffalo, in the county of Erie and State of New York, have invented certain new and useful Improvements in Vehicle-Axles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to certain improvements in axles for vehicles, by means of which the hub-boxing is not permitted to have frictional contact with the spindle of the axle and to that end it consists in interposing between the hub-boxing and the spindle a removable non-revoluble collar which fits loosely but snugly in the annular space between these two parts, and held in place by a nut integral with the collar and adapted for screw-threaded engagement with the end of the spindle the outer surface of the collar receiving the frictional contact of the hub-boxing in the revolution of the wheel substantially as hereinafter shown.

I will now proceed to minutely describe the manner in which I have carried out my invention and then claim what I believe to be novel.

In the drawings, Figure 1 represents partly in central longitudinal section my complete invention. Fig. 2 is a detached view of the axle with its spindle. Fig. 3 is a similar view of the collar and attached nut, and Figs. 4 and 5 are respectively side and end views of the hub-boxing.

Referring to the drawings, 1 is the axle carrying the cylindrical spindle 2 at one end of which is the cylindrical shoulder 3 having cut around its outer surface the sand-groove 4. The outer end of the spindle is provided with the screw-threaded end 5 of smaller diameter than the spindle.

6 is the hub-boxing having the interior cylindrical surface 7 of slightly larger diameter than the spindle 2. Its outer surface is slightly tapering and has the ribs 8 8 diametrically opposite each other which serve to prevent the turning of the boxing in the hub, not shown. The inner end of the boxing has the cylindrical recess 9 of larger diameter than the inner surface 7 for the reception of the shoulder 3 upon the axle and a circular groove 10 is cut just inside of the recess 9 for the reception and retention of the outer edge of a washer 11 which rests against the shoulder 3 upon the axle.

12 is a cylindrical collar its closed end having the annular shoulder 13 and adjoining nut 14 provided with the inner central screw-threaded socket 15 adapted for the reception of the screw-threaded end 5 of the spindle. The collar 12 is provided upon its outer surface with the longitudinal groove 16 for the reception of a lubricant and 17 is a washer fitting in the annular shoulder 13 and against which the outer end of the hub-boxing is pressed. The parts just described are assembled as follows: The hub-boxing 6 carrying the wheel is slid upon the spindle 2 until the interior shoulder 18 strikes the shoulder 3 which fits snugly within the recess 9 in the boxing. The collar 12 carrying the nut 14 is then inserted in the annular space between the boxing and the spindle until the screw-threaded end 5 on the spindle and the socket 15 engage one with the other. On turning the nut until its shoulder meets the outer end of the boxing the union of parts is complete and they are ready for action. The inner surface 7 of the hub-boxing, as the wheel turns, bears upon, and has frictional contact with the outer surface of the stationary or non-revoluble collar, which thus serves as a protection to the spindle 2 of the axle, preventing any frictional wearing away and preserving the axle intact. It will thus be seen that with my improved construction, the renewing of the axles which are the most costly will only become necessary in the event of breakage.

The collar, when sufficiently worn to cause rattling, can be quickly and inexpensively replaced by a new one and the renewing of the hub-boxing will be necessary only at long intervals.

With my improved construction it will not be necessary to jack up the axle when oil is to be introduced into the bearing as the collar can be unscrewed and partially withdrawn without lifting the wheel, and oil poured into the groove of the collar which is then pushed back and fastened in position as already set forth.

The washer 11 resting in the groove 10 effectually prevents the entrance of any sand or foreign substances into the bearing.

I claim—

In a vehicle axle the combination with the hub boxing 6 having the cylindrical recess 9 of larger diameter than its interior cylindrical surface 7 and the annular groove 10 adapted for the reception of the washer 11 fitting closely around the spindle 2 and the spindle 2 having annular shoulder 3, adjacent sand groove 4 and screw-threaded end 5 of smaller diameter than the spindle, of the interposed non-revoluble collar 12 having the annular shoulder 13 carrying the washer 17 upon its inner face and the adjoining integral nut 14 having the inside screw-threaded socket 15 adapted for engagement with the screw-threaded end 5 of spindle 2 all combined and operating substantially as shown and described.

In testimony whereof I have signed my name to this specification in the presence of two subscribing witnesses.

GEORGE H. WESTINGHOUSE.

Witnesses:
W. T. MILLER,
O. E. HODDICK.